United States Patent [19]
Kobayashi et al.

[11] 3,893,945
[45] July 8, 1975

[54] CATALYST COMPOSITION FOR OXIDATION OF BUTENES

[75] Inventors: Masao Kobayashi; Minoru Ikeda; Kantaro Yamada; Hiromichi Ishii, all of Ohotake, Japan

[73] Assignee: Mitsubishi Rayon Company, Ltd., Tokyo, Japan

[22] Filed: Nov. 5, 1973

[21] Appl. No.: 412,680

[30] Foreign Application Priority Data
Nov. 13, 1972 Japan.............................. 47-113724
Nov. 20, 1972 Japan.............................. 47-116443
Nov. 20, 1972 Japan.............................. 47-116444

[52] U.S. Cl. ................ 252/435; 252/437; 252/439
[51] Int. Cl. ....................... B01j 11/82; B01j 11/22
[58] Field of Search.................... 252/437, 439, 435

[56] References Cited
UNITED STATES PATENTS

| | | | |
|---|---|---|---|
| 2,904,580 | 9/1959 | Idol................. | 252/437 X |
| 3,159,688 | 12/1964 | Jennings et al. ............... | 252/439 X |
| 3,171,859 | 3/1965 | Sennewald et al............. | 252/437 X |
| 3,192,259 | 6/1965 | Fetterly et al. ................ | 252/437 X |
| 3,269,957 | 8/1966 | Bethell............................... | 252/437 |
| 3,346,617 | 10/1967 | Hiroki et al..................... | 252/468 X |
| 3,487,109 | 12/1969 | Kurata et al. ................... | 252/439 X |
| 3,655,750 | 4/1972 | Ondrey et al................... | 252/439 X |
| 3,668,147 | 6/1972 | Yoshino et al.................. | 252/437 X |
| 3,790,501 | 2/1974 | Walker.............................. | 252/437 |

*Primary Examiner*—Garvin Patrick P.
*Attorney, Agent, or Firm*—Oblon, Fisher, Spivak, McClelland & Maier

[57] ABSTRACT

A novel catalyst composition for vapor-phase oxidation of butenes which is active at a temperature in the range from 250° to 450°C and capable of converting n-butenes and iso-butene selectively into 1,3-butadiene and methacrolein, respectively. The said catalyst composition contains tungsten, molybdenum, tellurium, antimony and oxygen, one combination selected from among (a) nickel and cobalt, (b) nickel and iron, (c) nickel, cobalt and bismuth and (d) nickel, iron and bismuth, and at least one member selected from the group consisting of potassium, rubidium and cesium. Phosphorus and/or tin may also be added to the catalyst composition.

5 Claims, No Drawings

CATALYST COMPOSITION FOR OXIDATION OF BUTENES

This invention relates to a novel catalyst composition for vapor-phase oxidation of butenes.

Methacrolein is a useful substance as it is and also as an intermediate for preparation of methacrylic acid. Butadiene is also an important chemical. It is already known to prepare simultaneously butadiene and methacrolein by vapor-phase catalytic oxidation of a mixture of n-butenes (including 1-butene, cis-2-butene, and trans-2-butene) and iso-butene, as disclosed in British Patent Specifications No. 1,286,081, No. 1,286,082, No. 1,286,083 and U.S. Pat. No. 3,159,688. Processes for preparation of butadiene by oxidative dehydrogenation of n-butene are disclosed in Belgian Patent Specification No. 757,476, etc. Preparation of methacrolein from isobutylene in a manner analogous to that of acrolein from propylene has been known for a long time, but with poor results as compared with the case of oxidation of propylene. Recently, improved methods of oxidation of isobutylene are proposed, as disclosed in Belgian Patent Specifications No. 769,689 and No. 774,905. However, according to these methods, selectivity to methacrolein is comparatively low, namely from 65 to 73%.

An object of the present invention is to provide a novel catalyst composition suitable for obtaining methacrolein from iso-butene.

Another object of the present invention is to provide a novel catalyst composition suitable for obtaining 1,3-butadiene from n-butenes.

Still another object is to provide a novel catalyst composition which can oxidize selectively butenes at high conversions at a reaction temperature of 450°C or lower.

The present invention provides a process for production of methacrolein, 1,3-butadiene or both, which comprises contacting n-butenes and/or iso-butene at an elevated temperature in a vapor phase in the presence of molecular oxygen with a catalyst composition which consists essentially of tungsten, molybdenum, tellurium, antimony and oxygen and additionally contains one combination selected from among (a) two-member combination of nickel and cobalt, (b) two-member combination of nickel and iron, (c) three-member combination of nickel, cobalt and bismuth and (d) three-member combination of nickel, iron and bismuth and further contains at least one of potassium, rubidium and cesium. Addition of tin to the catalyst composition of the present invention is preferred to make the catalyst life longer. Phosphorus may also be added to the catalyst composition, if desired. When iso-butene is used as the starting material in practicing the reaction according to the process of the present invention, methacrylic acid is also obtained in lesser amounts together with methacrolein. Similarly, when a mixed gas containing n-butenes and iso-butene is used, 1,3-butadiene, methacrolein and a small amount of methacrylic acid are obtained.

The state in which the catalyst of this invention exists is not critical in any way, but the catalyst is preferably in the form of the oxidation product of that which has the metallic elements combined in some manner or other rather than in the form of a mixture of the oxides of these elements.

In the catalyst composition to be used in the present invention, the atomic ratios of phosphorus and respective metallic elements may be widely varied without losing higher catalytic activity, but the ranges of atomic ratios suitable for practical applications are as follows. The atomic ratio of tungsten to molybdenum (W/Mo) is from 0.01 to 100, preferably from 0.02 to 50. The atomic ratio of tellurium to the sum of tungsten and molybdenum (Te/(W + Mo)) is from 0.01 to 0.2, preferably from 0.02 to 0.15. The atomic ratio of phosphorus to the sum of tungsten and molybdenum (P/(W + Mo)) is from 0 to 1, preferably 0.02 to 0.3. The atomic ratio of antimony to the sum of tungsten and molybdenum (Sb/(W + Mo)) is from 0.01 to 1, preferably from 0.1 to 0.3. The atomic ratio of tin to the sum of tungsten and molybdenum (Sn/(W + Mo)) is from 0 to 1. As to the proportion of the combination (a), (b), (c) or (d) as mentioned above which is selected from the group of metals consisting of nickel, cobalt, iron and bismuth, the atomic ration of said combination to the sum of tungsten and molybdenum is desired to fall in the range of from 0.08 to 2 with respect to the total of the metallic members involved and in the range of from 0.02 to 1 with respect to each of the metallic members involved. Potassium, rubidium, and/or cesium are added in an amount of 0.0005 to 0.3, preferably 0.002 to 0.1, in terms of the atomic ratio to the sum of tungsten and molybdenum [(K, Rb and/or Cs)/(Mo + W)].

The catalyst of the present invention may be used supported on any of the well-known carriers such as silica gel, silica-alumina, corundum, silicon carbide and pearlite.

For preparation of the catalyst of the present invention, any conventionally known procedure may practically be used. A typical procedure comprises the steps of evaporating to dryness either the aqueous solution or suspension of raw materials of the catalyst and subsequently calcining the evaporation product in the air. The raw materials for the catalyst are desired to be in the form of metals, oxides or chlorides thereof, or acids, ammonium salts, nitrates or the like which are convertible into oxides by calcination. It is also permissible to use raw materials having respective metallic elements chemically combined such as ammonium phosphotungstate, telluromolybdic acid and stannomolybdic acid.

The starting n-butenes or iso-butene used for the reaction may contain impurities such as n-butane, isobutane and the like. The composition of the isomers of n-butenes is not critical, since 1-butene, cis-2-butene, and trans-2-butene which constitute n-butenes are easily isomerized on the catalyst. As the oxygen source to be used for the present invention, air is preferably used from an economical standpoint. The molar ratio of oxygen to butenes in the feed gas may be within the range from 0.1 to 5, preferably from 0.2 to 3. Both concentrations of oxygen and butenes in the feed gas are each from 1 to 20 vol.%, preferably, from 3 to 15 vol.%. In order to maintain the concentrations at said levels, the feed gas is diluted suitably with other gases such as nitrogen, steam, carbon dioxide, butane, etc.

The reaction may be conducted either under normal or increased pressure. The reaction temperature is from 250° to 450°C, preferably from 300° to 390°C. The contact time is preferably within the range from 0.5 to 10 seconds. Although the reaction temperature may be elevated to higher than 450°C, it is not favorable because side reactions are more predominant and the catalyst life is shortened.

The present invention is further illustrated by referring to the following Examples, wherein "parts" signify "parts by weight" and conversion and selectivity are defined as follows:

$$\text{Conversion}(\%) = \frac{\text{Butene charged (moles)} - \text{Butene unaltered (moles)}}{\text{Butene charged (moles)}} \times 100$$

$$\text{Selectivity}(\%) = \frac{\text{Product(1,3-butadiene, methacrolein and/or methacrylic acid) (moles)}}{\text{Butene charged (moles)} - \text{Butene unaltered (moles)}} \times 100$$

EXAMPLE 1

In 50 parts of water, 2.25 parts of ammonium paratungstate were dissolved. To this solution was added a solution having 35.3 parts of ammonium paramolybdate dissolved in 200 parts of water and 100 parts of silicon carbide and 4.9 parts of antimony oxide were added thereto. Furthermore, a mixed solution having 20.2 parts of iron nitrate and 43.7 parts of nickel nitrate dissolved in 500 parts of water and a solution having 2.57 parts of potassium nitrate dissolved in 20 parts of water were added to the solution, than a solution having 16.2 parts of bismuth nitrate dissolved in 50 parts of 10% nitric acid and a solution having 3.8 parts of stannous chloride dissolved in 50 parts of water were added thereto. Finally, 0.95 parts of 85% phosphoric acid were added to the solution. The mixture thus prepared was evaporated to dryness under stirring and then calcined under air stream at 500°C for 5 hours. The calcined product was incorporated with 5.35 parts of tellurium dioxide and, after thorough mixing, pelleted to provide for use as catalyst.

A feed gas containing 5.4% of a mixed butene (1-butene: 39%; cis-2-butene: 10%; trans-2-butene: 10%; isobutene: 41%), 12.6% of oxygen, 35% of steam and 47% of nitrogen (all '%' are 'mole %') was charged into the catalyst layer maintained at 365°C and the reaction was carried out at a contact time of 3.6 seconds.

The produced gas was analyzed by gas chromatography to give the result as shown in the Table.

EXAMPLE 2

In 600 parts of water, 27.0 parts of ammonium paratungstate were dissolved. To this solution were added 4.9 parts of antimony oxide. A solution having 35.3 parts of ammonium paramolybdate dissolved in 200 parts of water and a mixed solution having 13.5 parts of iron nitrate and 4.9 parts of nickel nitrate dissolved in 100 parts of water were further added to the solution. Then, a solution having 32.3 parts of bismuth nitrate dissolved in 150 parts of 10% nitric acid and a solution having 1.54 parts of potassium nitrate dissolved in 20 parts of water were added to the solution, followed further by addition of 5.6 parts of tellurium dioxide. The mixture thus prepared was evaporated to dryness under stirring, dried at 130°C and thereafter pelleted. The pelleted product was calcined under an air stream at 500°C for 5 hours and provided for use as catalyst.

By the use of the above catalyst, Example 1 was repeated, but the catalyst layer was maintained at 370°C. The result is given in the Table.

EXAMPLE 3

In 600 parts of water were dissolved 38.5 parts of ammonium paratungstate. To this solution were added 100 parts of silicon carbide powders and 0.69 parts of antimony oxide powders. Furthermore, a solution having 5 parts of ammonium paramolybdate dissolved in 200 parts of water, a mixed solution having 2.7 parts of cobalt nitrate and 2.8 parts of nickel nitrate dissolved in 100 parts of water and a solution having 0.863 parts of potassium nitrate dissolved in 20 parts of water were added to the solution. Subsequently, 5.0 parts of 85% phosphoric acid were added to the solution, followed finally by addition of a solution having 2.1 parts of stannous chloride dissolved in 50 parts of water. The mixture was evaporated to dryness under stirring over a water bath. Then, the product was calcined under air stream at 500°C for 5 hours. After the calcined product was incorporated with 4.1 parts of tellurium dioxide and mixed thoroughly, it was pelleted to provide for use as catalyst.

By the use of this catalyst, Example 1 was repeated, but the catalyst layer was maintained at 360°C. The result is listed also on the Table.

EXAMPLE 4

In 600 parts of water were dissolved 38.5 parts of ammonium paratungstate and to this solution were added 73 parts of antimony oxide powders and 100 parts of silicon carbide powders. Furthermore, a solution having 35.3 parts of ammonium paramolybdate dissolved in 200 parts of water, a mixed solution having 33.7 parts of iron nitrate and 8.3 parts of nickel nitrate dissolved in 200 parts of water and a solution having 2.57 parts of potassium nitrate dissolved in 20 parts of water were added to the solution. Subsequently, 6.6 parts of 85% phosphoric acid were added to the solution, followed finally by addition of a solution having 30.0 parts of stannous chloride dissolved in 300 parts of water. The mixture was evaporated to dryness under stirring over a water bath. The product was then calcined under air stream at 500°C for 5 hours. After the calcined product was incorporated with 6.8 parts of tellurium dioxide and mixed thoroughly, it was pelleted to provide for use as catalyst.

Example 1 was repeated by the use of this catalyst, but the catalyst layer was maintained at 330°C, whereby the result as shown in the Table was obtained.

EXAMPLE 5

In 100 parts of water were added 4.5 parts of ammonium paratungstate and to this solution were added 4.9 parts of antimony oxide. Furthermore, a solution having 35.3 parts of ammonium paramolybdate dissolved in 200 parts of water, a mixed solution having 4.8 parts of cobalt nitrate and 19.4 parts of nickel nitrate dissolved in 100 parts of water and a solution having 1.26 parts of rubidium chloride dissolved in 20 parts of water were added to the solution. Subsequently, a solution having 8.1 parts of bismuth nitrate dissolved in 60 parts of 10% nitric acid and 1.9 parts of 85% phosphoric acid were added to the solution, followed further by addition of 2.5 parts of stannic oxide and 0.8 parts of tellurium dioxide. The mixture was evaporated to dryness under stirring over a water bath and, after drying at 120°C, pelleted and calcined under air stream at 500°C for 5 hours to provide for use as catalyst.

Example 1 was again repeated by the use of this catalyst, but maintaining the catalyst layer at 360°C, to obtain the result as shown in the Table.

EXAMPLE 6

A catalyst was prepared in the same manner as described in Example 1 except that 0.85 parts of potassium nitrate and 1.24 parts of rubidium nitrate were used in place of 0.85 parts of potassium nitrate. Oxidation of the mixed butene was conducted under the same conditions as in Example 1 by the use of this catalyst, but the catalyst layer was maintained at 360°C. The result is listed on the Table.

EXAMPLES 7 – 12

In Examples 7 – 12, the same catalysts as prepared in Examples 1 – 6 were used, respectively. A feed gas containing 5% of iso-butene, 10% of oxygen, 35% of steam

EXAMPLE 20

A catalyst was prepared in the same manner as described in Example 1, except that 3.25 parts of cesium nitrate were used in place of 2.57 parts of potassium nitrate. Oxidation of iso-butene was conducted under the same conditions as in Example 7 by the use of this catalyst. The results are set forth on the Table.

EXAMPLE 21

A catalyst were prepared in the same manner as described in Example 1, except that 0.98 part of cesium nitrate and 0.84 part of potassium nitrate were used in place of 2.57 parts of potassium nitrate. Oxidation of iso-butene was conducted under same conditions as in Example 7 by the use of this catalyst. The results are set forth on the Table.

| Example No. | Catalyst | Reaction temperature °C | Conversion of n-butene (%) | Conversion of iso-butene (%) | Selectivity of 1,3-butadiene (%) | Total selectivity of methacrolein and methacrylic acid (%) |
|---|---|---|---|---|---|---|
| 1 | (W-Mo-Te-Sb-O)-Sn-P(Fe-Ni-Bi)-K | 365 | 90.0 | 93.0 | 85.0 | 91.0 |
| 2 | (W-Mo-Te-Sb-O)-P-(Fe-Ni-Bi)-K | 370 | 89.0 | 93.0 | 83.0 | 89.0 |
| 3 | (W-Mo-Te-Sb-O)-Sn-P-(Co-Ni)-K | 360 | 89.0 | 92.5 | 85.0 | 90.0 |
| 4 | (W-Mo-Te-Sb-O)-Sn-P-(Fe-Ni)-K | 330 | 90.0 | 92.0 | 82.0 | 85.0 |
| 5 | (W-Mo-Te-Sb-O)-Sn-P-(Co-Ni)-Rb | 360 | 90.5 | 91.0 | 84.5 | 87.0 |
| 6 | (W-Mo-Te-Sb-O)-Sn-P-(Fe-Ni-Bi)-(K-Rb) | 360 | 92.0 | 95.0 | 85.0 | 90.0 |
| 7 | (W-Mo-Te-Sb-O)-Sn-P-(Fe-Ni-Bi)-K | 350 | — | 96.0 | — | 82.0 |
| 8 | (W-Mo-Te-Sb-O)-P-(Fe-Ni-Bi)-K | 345 | — | 90.0 | — | 81.0 |
| 9 | (W-Mo-Te-Sb-O)-Sn-P-(Co-Ni)-K | 370 | — | 95.0 | — | 83.0 |
| 10 | (W-Mo-Te-Sb-O)-Sn-P-(Fe-Ni)-K | 365 | — | 92.0 | — | 80.0 |
| 11 | (W-Mo-Te-Sb-O)-Sn-P-(Co-Ni)-Rb | 365 | — | 92.0 | — | 80.0 |
| 12 | (W-Mo-Te-Sb-O)-Sn-P-(Fe-Ni-Bi)-(K-Rb) | 360 | — | 94.0 | — | 85.0 |
| 13 | (W-Mo-TE-Sb-O)-Sn-P-(Fe-Ni-Bi)-K | 330 | 95.0 | — | 80.5 | — |
| 14 | (W-Mo-Te-Sb-O)-P-(Fe-Ni-Bi)-K | 350 | 91.0 | — | 81.0 | — |
| 15 | (W-Mo-Te-Sb-O)-Sn-P-(Co-Ni)-K | 370 | 95.0 | — | 80.0 | — |
| 16 | (W-Mo-Te-Sb-O)-Sn-P-(Fe-Ni)-K | 365 | 90.5 | — | 81.0 | — |
| 17 | (W-Mo-Te-Sb-O)-Sn-P-(Co-Ni)-Rb | 330 | 84.5 | — | 80.5 | — |
| 18 | (W-Mo-Te-Sb-O)-Sn-P-(Fe-Ni-Bi)-(K-Rb) | 340 | 90.0 | — | 83.0 | — |
| 19 | (W-Mo-Te-Sb-O)-Sn-(Fe-Ni-Bi)-K | 345 | — | 96.0 | — | 80.5 |
| 20 | (W-Mo-Te-Sb-O)-Sn-P-(Fe-Ni-Bi)-Cs | 385 | — | 91.0 | — | 83.5 |
| 21 | (W-Mo-Te-Sb-O)-Sn-P-(Fe-Ni-Bi)-(Cs-K) | 375 | — | 92.0 | — | 86.7 | and 50% of nitrogen (all '%' are 'mole %') was charged into each catalyst layer maintained at the respective temperature as set forth in the Table. All the reactions were carried out at the contact time of 4.8 seconds. The results are set forth on the Table.

EXAMPLES 13 – 18

The same catalysts as prepared in Examples 1 – 6 were used, respectively, in Examples 13 – 18. A feed gas containing 4% of n-butenes, 10% of oxygen, 35% of steam and 51% of nitrogen (all '%' are 'mole %') was charged into each catalyst layer maintained at the respective temperature as set forth in the Table. All the reactions were carried out at the contact time of 3.6 seconds. The results are also listed on the Table.

EXAMPLE 19

A catalyst was prepared in the same manner as described in Example 1 except phosphoric acid was not used. Oxidation of iso-butene was conducted under the

What we claim is:

1. The catalyst composition for the vapor-phase oxidation of butenes at a temperature in the range of 250°–450°C which oxidizes n-butenes and iso-butene respectively to 1,3-butadiene and methacrolein respectively, consisting essentially of:

a first component of a mixture of oxides of tungsten, molybdenum, tellurium and antimony, wherein the W/Mo atomic ratio ranges from 0.01 to 100, the Te/(W+Mo) atomic ratio ranges from 0.01 to 0.2, and the Sb/(W+Mo) atomic ratio ranges from 0.01 to 1;

a second component of one metal oxide mixture of nickel and cobalt; nickel and iron; nickel, cobalt and bismuth; or nickel, iron and bismuth; wherein the atomic ratio of the combined metals of each metal oxide mixture to W+Mo is in the range of 0.08–2 and wherein the atomic ratio of the individual metals of each metal oxide mixture to W+Mo is in the range of 0.02–1; and a third component of at least one alkali metal oxide selected from the group consisting of potassium, rubidium and cesium, wherein the atomic ratio of the alkali metal of each alkali metal oxide or each alkali metal oxide mixture to W+Mo ranges from 0.0005 to 0.3.

2. The catalyst composition of claim 1, which further comprises the presence of tin oxide, wherein the Sn/(W+Mo) atomic ratio has an upper limit of 1.

3. The catalyst composition of claim 1, which further comprises the presence of phosphorous oxide, wherein the P/(W+Mo) atomic ratio has an upper limit of 1.

4. The catalyst composition of claim 1, wherein said alkali metal is potassium or rubidium.

5. The catalyst composition of claim 1, wherein said second component is a metal oxide mixture of nickel, iron and bismuth.

* * * * *